United States Patent [19]
Oh et al.

[11] Patent Number: 6,137,881
[45] Date of Patent: Oct. 24, 2000

[54] ADAPTIVE FILTERING METHOD AND APPARATUS EMPLOYING MODIFIED FAST AFFINE PROJECTION ALGORITHM

[75] Inventors: Stephen S. Oh, Palo Alto, Calif.; Murtaza Ali; Darel Linebarger, both of Plano, Tex.

[73] Assignee: Texas Instruments Incorporated, Dallas, Tex.

[21] Appl. No.: 09/032,528

[22] Filed: Feb. 27, 1998

Related U.S. Application Data

[60] Provisional application No. 60/038,535, Feb. 28, 1997.

[51] Int. Cl.$^7$ .................................................. H04M 1/00
[52] U.S. Cl. ........................... 379/410; 379/406; 455/570
[58] Field of Search ..................... 379/410, 406; 455/570, 63, 67.3, 501

[56] References Cited

U.S. PATENT DOCUMENTS 5,272,695  12/1993  Makino et al. ..................... 379/410 X
5,848,105  12/1998  Gardner et al. ......................... 375/336

OTHER PUBLICATIONS

Makino et al.; Acoustic Echo Canceller Algorithm Based on the Variation Characteristics of a Room Impulse Respons; IEEE; pp. 1133–1136, 1990.

Tanaka et al.; Fast Projection Algorithm and Its step Size Control; IEEE; pp. 945–948, 1995.

Liu et al.; On the Use of a Modified Fast Affine Projection Algorithm in Subbands for Acoustic Echo Cancelation; IEEE; pp. 354–357, 1996.

Makino et al.; SSB Subband Echo Canceller Using Low–Order Projection Algorithm; IEEE; pp. 945–948, 1996.

Reed et al.; Acoustic Echo Cancellation with the Fast Affine Projection; University of Essex; IEEE; pp. 16/1–16/8, 1998.

Been Rabaa et al.; Acoustic Echo Cancellation based on a Recurrent Neural Network and a Fast Affine Projection Algorithm; IEEE; pp. 1754–1755, 1998.

Muneyasu et al.; A New 2–D Adaptive Filter Using Affine Projection Algorithm; IEEE; pp. V–92 to V–93, 1998.

Tanaka et al.; A Block Exact Fast Affine Projection Algorithm; IEEE; pp. 79–86, 1999.

Yutaka Kaneda et al., "An Adaptive Algorithm with Fast Convergence for Multi–Input Sound Control," Active 95, pp. 993–1004, Jul. 6–8, 1995.

Steven L. Gay et al., "The Fast Affine Projection Algorithm," IEEE, pp. 3023–3026, 1995.

Kazuhiko Ozeki et al., "An Adaptive Filtering Algorithm Using an Orthogonal Projection to an Affine Subspace and Its Properties," Electronic and Communications in Japan, vol. 67–A, No. 5, pp. 19–27, 1984.

*Primary Examiner*—Richemond Dorvil
*Assistant Examiner*—Abul K. Azad
*Attorney, Agent, or Firm*—Robert D. Marshall, Jr.; W. James Brady, III; Frederick J. Telecky, Jr.

[57] ABSTRACT

This invention is a method and apparatus for acoustic echo cancellation. The acoustic echo cancellation employs a modified fast affine projection filter algorithm. The projection order of the affine projection filter algorithm is selected to be small relative to the delay parameter of the transversal filter. This selection of the projection order permits a simplifying approximation in the auto-correlation matrix (the simplified matrix is called a Toeplitz matrix) of the fast affine projection filter algorithm. This simplifying approximation reduces the computational complexity of the filter algorithm without great adverse change in the convergence rate or in the residual. This modified fast affine projection filter algorithm may be practiced on a programmed digital signal processor.

7 Claims, 2 Drawing Sheets

ADAPTIVE FILTERING METHOD AND APPARATUS EMPLOYING MODIFIED FAST AFFINE PROJECTION ALGORITHM

This application claims priority under 35 USC 119 (e) (1) of provisional application Ser. No. 60/038,535, filed Feb. 28, 1997.

TECHNICAL FIELD OF THE INVENTION

The technical field of this invention is adaptive filters and particularly adaptive filers used in echo cancellation employing a modified fast affine projection algorithm.

BACKGROUND OF THE INVENTION

Hands free telephones, also known as speaker phones, have a problem with echo feedback. Examples of speaker phones are: mobile cellular telephones which may be used in automobiles; teleconferencing systems; and desk top telephones. The sound from a speaker propagates into the room including the speaker phone and echoes return to the microphone. This acoustic feedback disturbs the normal speaking. Acoustic echo cancellation systems sample some of the incoming signal and construct an estimate of the echo. The echo estimate is subtracted from the microphone signal to produce an echo reduced signal to sent to the far-end unit.

A transversal adaptive filter is typically used in acoustic echo cancellation systems. The maximum echo delay determines the size of the transversal filter. Acoustic echo cancellation systems need to be adaptive because the manufacturer of the speaker phone typically does not know the exact acoustic environment where the speaker phone is used. In the case of mobile cellular telephones, the user will change the location of use and thereby change the acoustic environment. Even for speaker phones used in fixed locations there will be a wide variation in the acoustic environment between possible use locations.

SUMMARY OF THE INVENTION

This invention is a method and apparatus for acoustic echo cancellation. The acoustic echo cancellation employs a modified fast affine projection filter algorithm. The projection order of the affine projection filter algorithm is selected to be small relative to the delay parameter of the transversal filter. This selection of the projection order permits a simplifying approximation in the auto-correlation matrix of the fast affine projection filter algorithm. This simplified matrix, known as the Toeplitz matrix, reduces the computational complexity of the filter algorithm without great adverse change in the convergence rate or in the residual. This simplifying approximation also improves the numerical stability of the filter algorithm. This modified fast affine projection filter algorithm may be practiced on a programmed digital signal processor.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
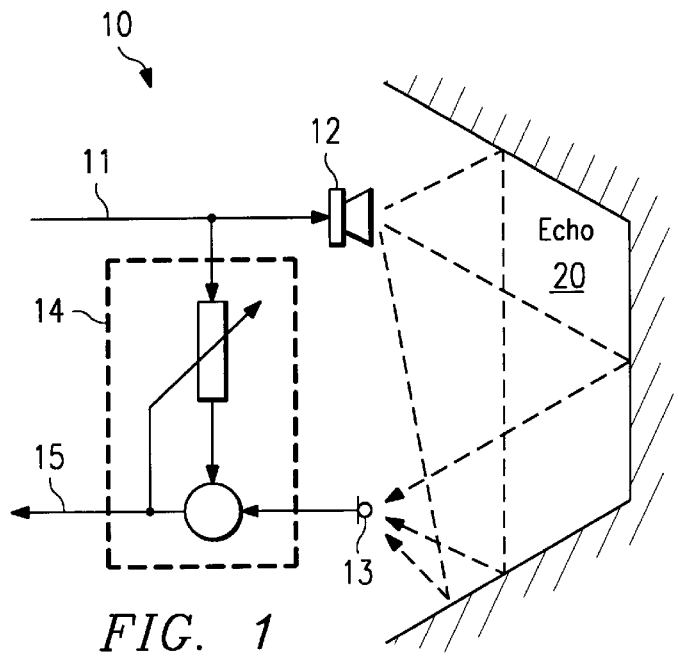
FIG. 1 illustrates a conceptual view of an echo cancellation system used in a speaker phone employing an adaptive filter constructed according to this invention.

FIG. 1 illustrates a conceptual view of an echo cancellation system used in a speaker phone 10 employing an adaptive filter constructed according to this invention. In general a far-end speech signal x(n) from another telephone received via line 11 is supplied to a loudspeaker 12 and to an input of the adaptive filter 14. The loudspeaker 12 enables the user of speaker phone 10 to hear the speech of another person speaking into the other telephone. The speech of the user is captured by a microphone 13 and converted into a near-end speech signal d(n). Due to the nature of the speaker phone 10, the microphone 13 samples not only the near-end speech but also acoustic echoes from the loudspeaker 12. The nature and strength of the echo signal within near-end signal d(n) depends upon the acoustic environment of the room 20 in which the speaker phone 10 is used. An adaptive filter 14 samples the far-end speech signal x(n) and forms an echo estimate signal which is subtracted from the near-end signal d(n) from the microphone. The echo estimate signal preferably equals the portion of the near-end signal corresponding to the acoustic echo. The adaptive filter 14 subtracts this echo estimate signal from the near-end signal to produce the output signal 15 transmitted to the other telephone. Thus the output signal 15 transmitted to the other telephone has the echo cancelled out. The filter is adaptive because the filter can change in nature to accommodate changes in the enclosure acoustics via feedback from the output signal.

Figure 2:
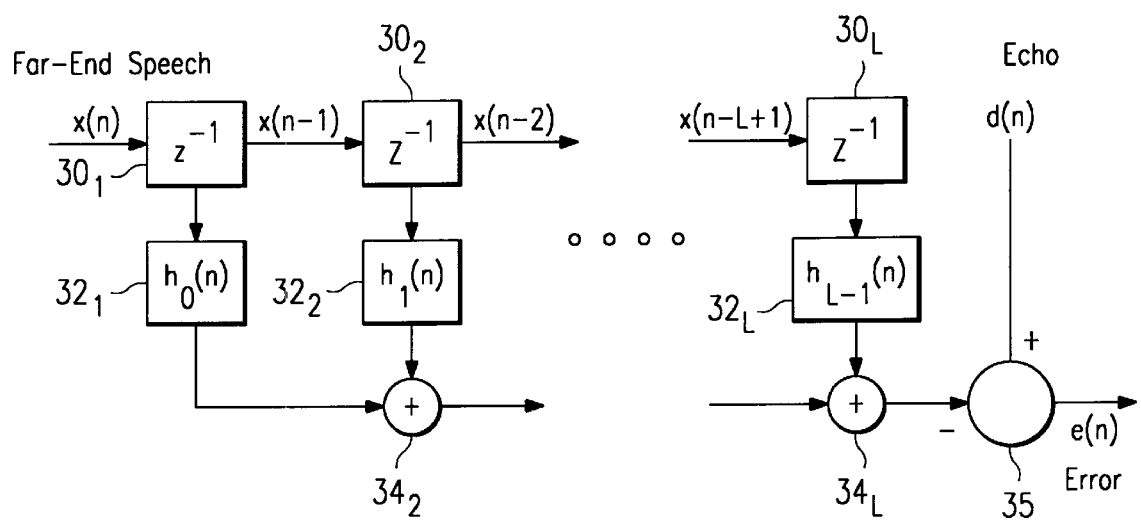
FIG. 2 illustrates a conceptual view of the computations of the adaptive filter illustrated in FIG. 1.

FIG. 2 illustrates a conceptual view of the computations of the adaptive filter 14. The far-end signal x(n) is supplied to a series of delays $30_1$ to $30_L$. This can be conceptually viewed a delay line with plural taps. Each delayed signal is multiplied by a filter coefficient $h_i(n)$ in a corresponding multiplier $32_i$. The products are summed in adders $34_2$ to $34_1$ to produce the filtered signal. Subtractor 35 subtracts the filtered far-end signal from the near-end signal d(n) which includes the echo producing a resultant error signal e(n). The total delay of the filter system must be on the same magnitude as the longest echo delay of the room employed. Plural delay taps permits the filter to accommodate echoes from differing acoustic features with different locations and different delay times. In accordance with this invention, the individual filter coefficients $h_i(n)$ are adaptive based upon a sampling of the different output.

The terminology fast affine projection algorithm is as follows. The number of taps of the adaptive filter is L. The filter coefficients are $h_i(n)$ for $0 \leq i \leq L-1$ for times $n \geq 0$. The filter coefficients at time n may be expressed a vector:

$$\vec{h}_L(n) = \begin{bmatrix} h_0(n) \\ h_1(n) \\ \vdots \\ h_{L-1}(n) \end{bmatrix}$$

The input to the filter expressed in vector form is:

$$\vec{x}_L = \begin{bmatrix} x(n) \\ x(n-1) \\ \vdots \\ x(n-L+1) \end{bmatrix}$$

Thus the filter output $\hat{d}(n)$ is give by:

$$\hat{d}(n) = \sum_{i=0}^{i=L-1} h_i(n)x(n-i) = \left[\vec{h}_L(n)\right]^T \vec{x}_L(n)$$

where $[\vec{h}_L(n)]^T$ is the transpose of the vector $\vec{h}_L(n)$. If d(n) is the desired output of the filter, then the error e(n) is given by:

$$e(n)=d(n)-\hat{d}(n)=d(n)-[\vec{h}_L(n)]^T\vec{x}_L(n)$$

The task of the adaptive filter is to control the filter coefficients $h_i(n)$ to minimize e(n). This task is accomplished by sampling the error signal e(n).

The affine projection algorithm is a generalization of the least mean square algorithm. The least mean square algorithm is widely used in adaptive filtering due to its simplicity. The affine projection algorithm employs p previous data vectors $\vec{x}_L(n)$, $\vec{x}_L(n-1)$, $\vec{x}_L(n-2)$ ... $\vec{x}_L(n-p+1)$ in the update of the filter coefficients $h_i(n)$. The number p is called the projection order. These plural previous data vectors may be expressed in form of an L by p matrix as:

$$X(n)=[\vec{x}_L(n), \vec{x}_L(n-1), \vec{x}_L(n-2) \ldots \vec{x}_L(n-p+1)]$$

This matrix X(n) is used to define a data auto-correlation matrix as follows:

$$R_p(n)=([X(n)]^T X(n)+\delta h_p)$$

where; δ is a small positive constant called the regularization constant. The regularization constant prevent numerical computation problems when the rank of $[X(n)]^T X(n)$ is less than p. In the affine projection algorithm the filter coefficients $h_i(n)$ are updated to lie in the sub-space spanned by the previous p data vectors; $\vec{x}_L(n)$, $\vec{x}_L(n-1)$, $\vec{x}_L(n-2)$ ... $\vec{x}_L(n-p+1)$, and result in zero error for the last p samples with the updated filter coefficients.

The affine projection algorithm is computationally between the normalized least mean square algorithm and the recursive least square algorithm. The affine projection algorithm is identical to the normalized least mean square algorithm if p is 1. The affine projection algorithm is identical to the recursive least square algorithm if p is L. The normalized least mean square algorithm is computationally simple but is slow to converge and results in a relatively large residual error. The recursive least square algorithm converges quickly with a low residual error but requires 4 to 5 times the computation of the normalized least mean square algorithm. The affine projection algorithm had performance and computational complexity between the normalized least mean square algorithm and the recursive least square algorithm.

This invention employs a modification of the affine projection algorithm developed by Keneda et al and described in *Proceedings for ACTIVE 95*, pages 993 to 1004, July 1995 entitled "An Adaptive Algorithm With Fast Convergence for Multi-Input Sound Control." For the purpose of this application, this modified algorithm of Keneda et al will be called the fast affine projection algorithm. The fast affine projection algorithm of Keneda et al does not explicitly compute the filter coefficients $h_i(n)$. Instead the filter function is divided into two parts. The first part computes a filter approximation vector $\vec{z}_L(n)$ which includes all the contributions to the filter coefficients except for that of the last p data vectors. The second part computes a pre-filtering coefficients $\vec{s}_p(n)$ including the contributions to the filter coefficients due to the last p data vectors. As described in Keneda et al, the fast affine projection algorithm includes inversion of the data auto-correlation matrix $R_p(n)$. The data auto-correlation matrix $R_p(n)$ at any n is the estimate of the p-dimensional matrix of the input signal. Thus:

$$R_p(n) =$$
$$\begin{bmatrix} r_0(n) & r_1(n) & r_2(n) & \ldots & r_{p-1}(n) \\ r_1(n-1) & r_0(n-1) & r_1(n-1) & \ldots & r_{p-2}(n-1) \\ r_2(n-2) & r_1(n-2) & r_0(n-2) & \ldots & r_{p-3}(n-2) \\ \vdots & \vdots & \vdots & \vdots & \vdots \\ r_{p-1}(n-p+1) & r_{p-2}(n-p+1) & r_{p-3}(n-p+1) & \ldots & r_0(n-p+1) \end{bmatrix}$$

where:

$$r_\tau(n) = \sum_{i=0}^{i=L-1} x(n-i)x(n-i-\tau)$$

which is an estimate of the auto-correlation at lag τ and the time instant n based upon the past L input data. In accordance with this invention, the adaptive filter will be limited to cases in which the projection order p is much less than the number of taps L. Thus:

$$r_\tau(n) \approx r_\tau(n-1) \approx r_\tau(n-2) \approx \ldots r_\tau(n-p+1)$$

This approximation holds because most of the contribution to $r_\tau(n)$ comes from terms that do not differ from $r_\tau(n-1)$ since the projection order p is much less than the number of taps L. This approximation permits a further simplification of the data auto-correlation matrix $R_p(n)$. Substitution of this approximation into the definition of the data auto-correlation matrix $R_p(n)$ yields equal terms in the diagonals as follows:

$$R_p(n) = \begin{bmatrix} r_0(n) & r_1(n) & r_2(n) & \ldots & r_{p-1}(n) \\ r_1(n) & r_0(n) & r_1(n) & \ldots & r_{p-2}(n) \\ r_2(n) & r_1(n) & r_0(n) & \ldots & r_{p-3}(n) \\ \vdots & \vdots & \vdots & \vdots & \vdots \\ r_{p-1}(n) & r_{p-2}(n) & r_{p-3}(n) & \ldots & r_0(n) \end{bmatrix}$$

Figure 3:
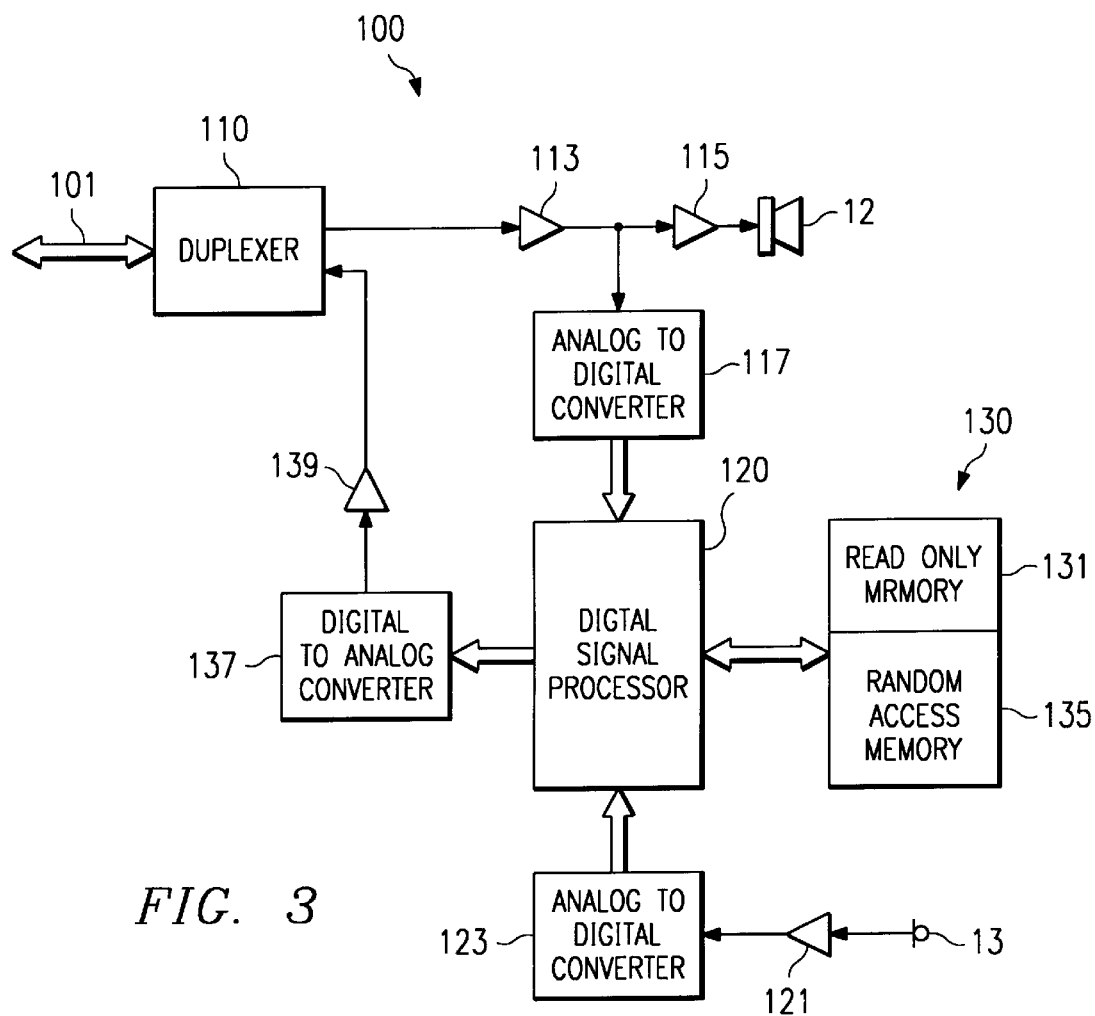
FIG. 3 illustrates in block diagram form an embodiment for practicing this invention in a speaker phone.

FIG. 3 illustrates in block diagram form an embodiment for practicing this invention in a speaker phone 100. Lines 101 couple speaker phone 100 to the telephone system in a conventional fashion. Duplexer 110 converts the two-way full duplex signal on lines 101 into an incoming signal and an outgoing signal in a manner known in the art. Duplexer 110 supplies the incoming signal to the input of preamplifier 113. Preamplifier 113 drives both amplifier 115 and analog to digital converter 117. Amplifier 115 drives speaker 12 in a conventional fashion. Analog to digital converter 117 samples and digitizes the incoming signal from preamplifier 113. As known in the art either preamplifier 113 or analog to digital converter 117 may include a low pass filter for anti-aliasing.

Microphone 13 receives ambient sound including the near-end speech and echoes. The output of microphone 13 drives the input of preamplifier 121. Preamplifier 121 in turn drives the input to analog to digital converter 123. Analog to digital converter 123 samples and digitizes the incoming signal from preamplifier 121. As known in the art either preamplifier 121 or analog to digital converter 123 may include a low pass filter for anti-aliasing.

Digital signal processor 120 forms the heart of speaker phone 100. Digital signal processor receives the digital signals from analog to digital converter 117 and analog to digital converter 123. Digital signal processor is further connected to a memory system 130 including read only memory 131 and random access (read/write) memory 135. Digital signal processor 120 employs a program permanently stored in read only memory 131 to perform the desired echo cancellation function. Digital signal processor 120 employs random access memory 135 to store incoming data before calculation, intermediate results and to buffer its output. Periodically and at the same rate as the sampling rate of analog to digital converters 117 and 121, digital signal processor 120 supplies an output data word to digital to analog converter 137. Digital to analog converter 137 converts this data word into an analog signal. This analog output of digital to analog converter 137 supplies the input of amplifier 139. The output of amplifier 139 supplies the input to duplexer 110. Duplexer 110 further supplies this signal to lines 101 for transmission via the telephone system to another telephone.

As previously described, the parameter L of adaptive filter 14 is selected to have the same time span as the longest expected echo delay in the room of use. Digital signal processor 120 models the tapped delay line illustrated in FIG. 2 using time spaced samples of the far-end speech signal x(n). The time between samples taken by analog to digital converter 117 equals the time delay of each of the delays $30_1$ to $30_L$. Digital signal processor 120 stores plural time samples corresponding to x(n), x(n−1), x(n−2) . . . x(n−L+1) for computation. In practicing the adaptive filter algorithm the number L is selected based upon the sample frequency and the size of the room using the speaker phone. A sampling frequency of about 8 KHz is used for telephonic applications. When using the common sampling frequency, L is set to several hundreds for a small room, such as an automobile, up to several thousands for a large room. Selection of the projection order p involves balancing the computational task with the expected convergence rate. The computational task will be low and the convergence rate low for low projection orders p. The computational task will be high and the convergence rate high for high projections orders p near L. For the purpose of the speaker phone of this invention, a projection order p of 4 or 5 is suitable.

The modified fast affine projection algorithm of this invention is practiced as noted below. There are two inputs into the algorithm. The first input is the near-end input signal x(n) from microphone 13 via analog to digital converter 123. The second input is the far-end input d(n) from the telephone line 101 via duplexer 110, amplifier 113 and analog to digital converter 117. The output of the algorithm is the error signal e(n). Digital signal processor 120 supplied this error signal e(n) to digital to analog converter 137. The analog output of digital to analog converter 137 is supplied to the telephone line 101 via amplifier 139 and duplexer 110.

The following variables are initialized:

$$\vec{z}_L(0) = \vec{0}_L$$

$$\vec{r}_p(0) = \begin{bmatrix} \delta \\ \vec{0}_{p-1} \end{bmatrix}$$

$$\vec{e}_p(0) = \vec{0}_p$$

$$\vec{s}_p(0) = \vec{0}_p$$

Note $\vec{0}_i$ is a zero vector of dimension i. Thus $\vec{z}_L(0)$, $\vec{e}_p(0)$ and $\vec{s}_p(0)$ are initialized as zero vectors. Note that δ is the small regularization constant previously described. The appropriate value for δ depends on the range given to x(n). If the range of x(n) has been normalized so that $-1 \leq x(n) \leq 1$, then a suitable range for δ is between 0.1 and 0.5. Note that all variables have a value of zero for indices n of less than zero. Following initialization, the algorithm is practiced iteratively. For each n starting with n=1 the algorithm:

1. Updates an auto-correlation vector:

$$\vec{r}_p(n) = \vec{r}_p(n-1) + x(n)\vec{x}_p(n) - x(n-L)\vec{x}_p(n-L)$$

where: x(n) is the nth sample of the input to the filter; and $\vec{x}_p(n)$ is a vector of dimension p defined as follows:

$$\vec{x}_p(n) = \begin{bmatrix} x(n) \\ x(n-1) \\ \vdots \\ x(n-p+1) \end{bmatrix}$$

Thus the calculation of the auto-correlation vector $\vec{r}_p(n)$ adds the next auto-correlation term $x(n)\vec{x}_p(n)$ to the prior auto-correlation vector $\vec{r}_p(n-1)$ and subtracts the last auto-correlation term $x(n-L)\vec{x}_p(n-L)$.

2. Calculates the prediction error:

$$\hat{d}(n) = [\vec{r}_{p-1}(n)]^T \vec{s}_{p-1}(n-1) + [\vec{x}_L(n)]^T \vec{z}_L(n-1)$$

where: $\vec{r}_{p-1}(n)$ is a vector of length p−1 similar to $r_p(n)$ except missing the first element, i.e.

$$\vec{r}_{p-1}(n) = \begin{bmatrix} r_1(n) \\ r_2(n) \\ \vdots \\ r_{p-1}(n) \end{bmatrix};$$

$[\vec{r}_{p-1}(n)]^T$ is the transpose of $\vec{r}_{p-1}(n)$ and $[\vec{x}_L(n)]^T$ is the transpose of $\vec{x}_L(n)$;

$$e(n) = d(n) - \hat{d}(n)$$

Note that e(n) is the output of the adaptive filter which digital processor 120 supplies to digital to analog converter 137.

$$\vec{e}_p(n) = \begin{bmatrix} e(n) \\ (1-\mu)\vec{e}_{p-1}(n-1) \end{bmatrix};$$

where $\vec{e}_{p-1}(n)$ is a vector of length p−1 similar to $\vec{e}_p(n)$ except missing the final element, i.e.

$$\vec{e}_{p-1}(n) = \begin{bmatrix} e_0(n) \\ e_1(n) \\ \vdots \\ e_{p-2}(n) \end{bmatrix}; \text{ and}$$

$\mu$ is an adaptation constant with $0 \leq \mu \leq 2$. If $\mu$ is near 0, then $\vec{e}_p(n)$ changes relatively slowly, so adaptation is slow. If $\mu$ is near 1, then $\vec{e}_p(n)$ changes relatively rapidly. Thus adaptation is also rapid, however too large a value of $\mu$ may induce ringing in the adaptation. For speaker phone echo cancellation applications suitable values for $\mu$ are between 0.3 and 0.5.

3. Forms the Toeplitz auto-correlation matrix according to the approximation of this invention:

$$R_p(n) = \begin{bmatrix} r_0(n) & r_1(n) & r_2(n) & \ldots & r_{p-1}(n) \\ r_1(n) & r_0(n) & r_1(n) & \ldots & r_{p-2}(n) \\ r_2(n) & r_1(n) & r_0(n) & \ldots & r_{p-3}(n) \\ \vdots & \vdots & \vdots & \vdots & \vdots \\ r_{p-1}(n) & r_{p-2}(n) & r_{p-3}(n) & \ldots & r_0(n) \end{bmatrix}$$

4. Calculates a pre-filtering vector:

$$\vec{g}_p(n) = [R_p(n)]^{-1} \vec{e}_p(n)$$

where: $[R_p(n)]^{-1}$ is the inversion of the matrix $R_p(n)$.

5. Updates the pre-filtering coefficients:

$$\vec{s}_p(n) = \begin{bmatrix} 0 \\ \vec{s}_{p-1}(n-1) \end{bmatrix} + \mu \vec{g}_p(n)$$

where: $\vec{s}_{p-1}(n)$ is a vector of length p−1 similar to $\vec{s}_p(n)$ except missing the final element, i.e.

$$\vec{s}_{p-1}(n) = \begin{bmatrix} s_0(n) \\ s_1(n) \\ \vdots \\ s_{p-2}(n) \end{bmatrix}; \text{ and}$$

$\mu$ is the adaptation constant previously described.

6. Updates the filter approximation vector:

$$\vec{z}_L(n) = \vec{z}_L(n-1) + [\vec{x}_L(n-p+1)][\vec{s}_p(n)]_p$$

where $[\vec{s}_p(n)]_p$ is the p-th element of $\vec{s}_p(n)$, i.e. $s_{p-1}(n)$. The process of steps 5 and 6 produce the prefiltering coefficients $\vec{s}_p(n)$ and the filter approximation vector $\vec{z}_L(n)$ used in step 2 in calculating the output error signal e(n). This process including steps 1 to 6 repeats for each n and the corresponding new input values x(n) and d(n).

What is claimed is:

1. A method for echo cancellation of a portion of a distant signal acoustically coupled to a near signal comprising the steps of:

sampling the distant signal at a predetermined sampling rate, thereby producing a series of sampled distant signals x(n) with n corresponding to a sample number;

sampling the near signal at said predetermined sampling rate, thereby producing a series of sampled near signals d(n);

selecting a delay parameter L whereby the product of L and a time between consecutive samples at said predetermined sampling rate corresponds to a longest expected echo delay time;

selecting a projection order p much smaller than said delay parameter L;

selecting a small regularization constant δ;

selecting an adaptation constant $\mu$, wherein $0 \leq \mu \leq 2$;

initializing a filter approximation vector $z_L(0)$ as a zero vector of dimension L;

initializing an auto-correlation vector $\vec{r}_p(0)$ of dimension L as follows $$\vec{r}_p(0) = \begin{bmatrix} \delta \\ \vec{0}_{p-1} \end{bmatrix};$$

initializing an error vector $\vec{e}_p(0)$ as a zero vector of dimension p;

initializing a pre-filtering coefficient vector $\vec{s}_p(n)$ as a zero vector of dimension p;

initializing an input vector $\vec{x}_p(n)$ as a vector of dimension p as follows:

$$\vec{x}_p(n) = \begin{bmatrix} x(n) \\ x(n-1) \\ \vdots \\ x(n-p+1) \end{bmatrix};$$

following said initializing steps, for each n starting with n=1 the algorithm (1) updating said auto-correlation vector as follows $$\vec{r}_p(n) = \vec{r}_p(n-1) + x(n)\vec{x}_p(n) - x(n-L)\vec{x}_p(n-L)$$

(2) calculating a prediction error $\hat{d}(n)$ as follows $$\hat{d}(n) = [\vec{r}_{p-1}(n)]^T \vec{s}_{p-1}(n-1) + [\vec{x}_L(n)]^T \vec{z}_L(n-1)$$

where: $\vec{r}_{p-1}(n)$ is a vector of dimension p−1 as follows $$\vec{r}_{p-1}(n) = \begin{bmatrix} r_1(n) \\ r_2(n) \\ \vdots \\ r_{p-1}(n) \end{bmatrix}; \text{ and}$$

$[\vec{a}]^T$ is a transpose of the vector $\vec{a}$;

(3) calculating an error signal e(n) as follows $$e(n) = d(n) - \hat{d}(n);$$

(4) calculating an error vector $\vec{e}_p(n)$ as follows $$\vec{e}_p(n) = \begin{bmatrix} e(n) \\ (1-\mu)\vec{e}_{p-1}(n-1) \end{bmatrix}$$

where: $e_{p-1}(n)$ is a vector of dimension p−1 as follows $$\vec{e}_{p-1}(n) = \begin{bmatrix} e_0(n) \\ e_1(n) \\ \vdots \\ e_{p-2}(n) \end{bmatrix};$$

(5) forming a Toeplitz auto-correlation matrix $R_p(n)$ as follows $$R_p(n) = \begin{bmatrix} r_0(n) & r_1(n) & r_2(n) & \ldots & r_{p-1}(n) \\ r_1(n) & r_0(n) & r_1(n) & \ldots & r_{p-2}(n) \\ r_2(n) & r_1(n) & r_0(n) & \ldots & r_{p-3}(n) \\ \vdots & \vdots & \vdots & \vdots & \vdots \\ r_{p-1}(n) & r_{p-2}(n) & r_{p-3}(n) & \ldots & r_0(n) \end{bmatrix};$$

(6) calculating a pre-filtering vector $\vec{g}_p(n)$ as follows $$\vec{g}_p(n) = [R_p(n)]^{-1} \vec{e}_p(n)$$

where: $[A]^{-1}$ is an inversion of the matrix A;

(7) updating said pre-filtering coefficients vector $\vec{s}_p(n)$ as follows $$\vec{s}_p(n) = \begin{bmatrix} 0 \\ \vec{s}_{p-1}(n-1) \end{bmatrix} + \mu \vec{g}_p(n);$$

where: $s_{p-1}(n)$ is a vector of dimensions p−1 as follows $$\vec{s}_{p-1}(n) = \begin{bmatrix} s_0(n) \\ s_1(n) \\ \vdots \\ s_{p-2}(n) \end{bmatrix};$$

(8) updating said filter approximation vector $\vec{z}_L(n)$ as follows $$\vec{z}_L(n) = \vec{z}_L(n-1) + [\vec{x}_L(n-p+1)][\vec{s}_p(n)]_p$$

where: $[\vec{s}_p(n)]_p$ is the p-th element of $\vec{s}_p(n)$, i.e. $s_{p-1}(n)$; and (9) outputting said output error signal e(n).

2. The method of claim 1, wherein:
said step of selecting said delay parameter L selects a number between hundreds and thousands.

3. The method of claim 1, wherein:
said step of selecting said projection order p selects a number of 4 or 5.

4. A speaker phone including an adaptive echo cancellation filter comprising:

an input line for receiving an incoming speech signal;

an amplifier connected to said input line for amplifying said incoming speech signal;

a loudspeaker connected to an output of said amplifier;

a first analog to digital converter having an input connected to said input line for sampling said speech signal at a predetermined sampling rate and producing a digital incoming speech signal x(n) corresponding to each sample at a first output;

a microphone;

a second analog to digital converter connected to said microphone for sampling a microphone signal of said microphone at said predetermined sampling rate and producing a digital microphone signal d(n) corresponding to each sample at a second output; and a digital signal processor having a first input connected to said first output of said first analog to digital converter, a second input connected to said second output of said second analog to digital converter and a digital signal processor output, said digital signal processor programmed to select a delay parameter L whereby the product of L and a time between consecutive samples at said predetermined sampling rate corresponds to a longest expected echo delay time;

select a projection order p much smaller than said delay parameter L;

select a small regularization constant δ;

select an adaptation constant $\mu$, wherein $0 \leq \mu \leq 2$;

initialize a filter approximation vector $\vec{z}_L(0)$ as a zero vector of dimension L;

initialize an auto-correlation vector $\vec{r}_p(0)$ as follows $$\vec{r}_p(0) = \begin{bmatrix} \delta \\ \vec{0}_{p-1} \end{bmatrix};$$

initialize an error vector $\vec{e}_p(0)$, as a zero vector of dimension p;

initialize a pre-filtering coefficient vector $\vec{s}_p(n)$ as a zero vector of dimension p;

initialize an input vector $\vec{x}_p(n)$ as a vector of dimension p as follows:

$$\vec{x}_p(n) = \begin{bmatrix} x(n) \\ x(n-1) \\ \vdots \\ x(n-p+1) \end{bmatrix};$$

following said initialize steps, for each n starting with n=1 the algorithm (1) update said auto-correlation vector as follows $$\vec{r}_p(n) = \vec{r}_p(n-1) + x(n)\vec{x}_p(n) - x(n-L)\vec{x}_p(n-L)$$

(2) calculate a prediction error $\hat{d}(n)$ as follows $$\hat{d}(n) = [\vec{r}_{p-1}(n)]^T \vec{s}_{p-1}(n-1) + [\vec{x}_L(n)]^T \vec{z}_L(n-1)$$

where: $\vec{r}_{p-1}(n)$ is a vector of dimension p−1 as follows $$\vec{r}_{p-1}(n) = \begin{bmatrix} r_1(n) \\ r_2(n) \\ \vdots \\ r_{p-1}(n) \end{bmatrix}; \text{ and}$$

$[\vec{a}]^T$ is a transpose of the vector $\vec{a}$;
 (3) calculate an error signal e(n) as follows $$e(n) = d(n) - \hat{d}(n);$$

(4) calculate an error vector $\vec{e}_p(n)$ as follows $$\vec{e}_p(n) = \begin{bmatrix} e(n) \\ (1-\mu)\vec{e}_{p-1}(n-1) \end{bmatrix}$$

where: $\vec{e}_{p-1}(n)$ is a vector of dimension p−1 as follows $$\vec{e}_{p-1}(n) = \begin{bmatrix} e_0(n) \\ e_1(n) \\ \vdots \\ e_{p-2}(n) \end{bmatrix};$$

(5) form a Toeplitz auto-correlation matrix $R_p(n)$ as follows $$R_p(n) = \begin{bmatrix} r_0(n) & r_1(n) & r_2(n) & \ldots & r_{p-1}(n) \\ r_1(n) & r_0(n) & r_1(n) & \ldots & r_{p-2}(n) \\ r_2(n) & r_1(n) & r_0(n) & \ldots & r_{p-3}(n) \\ \vdots & \vdots & \vdots & \vdots & \\ r_{p-1}(n) & r_{p-2}(n) & r_{p-3}(n) & \ldots & r_0(n) \end{bmatrix};$$

(6) calculate a pre-filtering vector $\vec{g}_p(n)$ as follows $$\vec{g}_p(n) = [R_p(n)]^{-1} \vec{e}_p(n);$$

where: $[A]^{-1}$ is an inversion of the matrix A;
 (7) update said pre-filtering coefficients vector $\vec{s}_p(n)$ as follows $$\vec{s}_p(n) = \begin{bmatrix} 0 \\ \vec{s}_{p-1}(n-1) \end{bmatrix} + \mu \vec{g}_p(n)$$

where: $\vec{s}_{p-1}(n)$ is a vector of dimensions p−1 as follows $$\vec{s}_{p-1}(n) = \begin{bmatrix} s_0(n) \\ s_1(n) \\ \vdots \\ s_{p-2}(n) \end{bmatrix};$$

(8) update said filter approximation vector $\vec{z}_L(n)$ as follows $$\vec{z}_L(n) = \vec{z}_L(n-1) + [\vec{x}_L(n-p+1)][\vec{s}_p(n)]_p$$

where: $[\vec{s}_p(n)]_p$ is the p-th element of $\vec{s}_p(n)$, i.e. $s_{p-1}(n)$;
 (9) output said output error signal e(n) at said digital signal processor output; and
a digital to analog converter having an input connected to said digital signal processor output and an analog output, said digital to analog converter converting said output error signal e(n) into an analog signal at said output.

5. The speaker phone of claim 4, wherein:
said digital signal processor is programmed to select said delay parameter L selects a number between hundreds and thousands.

6. The speaker phone of claim 4, wherein:
said digital signal processor is programmed to select said projection order p selects a number of 4 or 5.

7. The speaker phone of claim 4, further comprising:
a read only memory connected to said digital signal processor storing a program for controlling said digital signal processor.

\* \* \* \* \*